J. F. PILLSBURY.
SHUTTLE RELEASE FOR LOOMS.
APPLICATION FILED JULY 17, 1912.
1,059,904.
Patented Apr. 22, 1913.
2 SHEETS—SHEET 1.
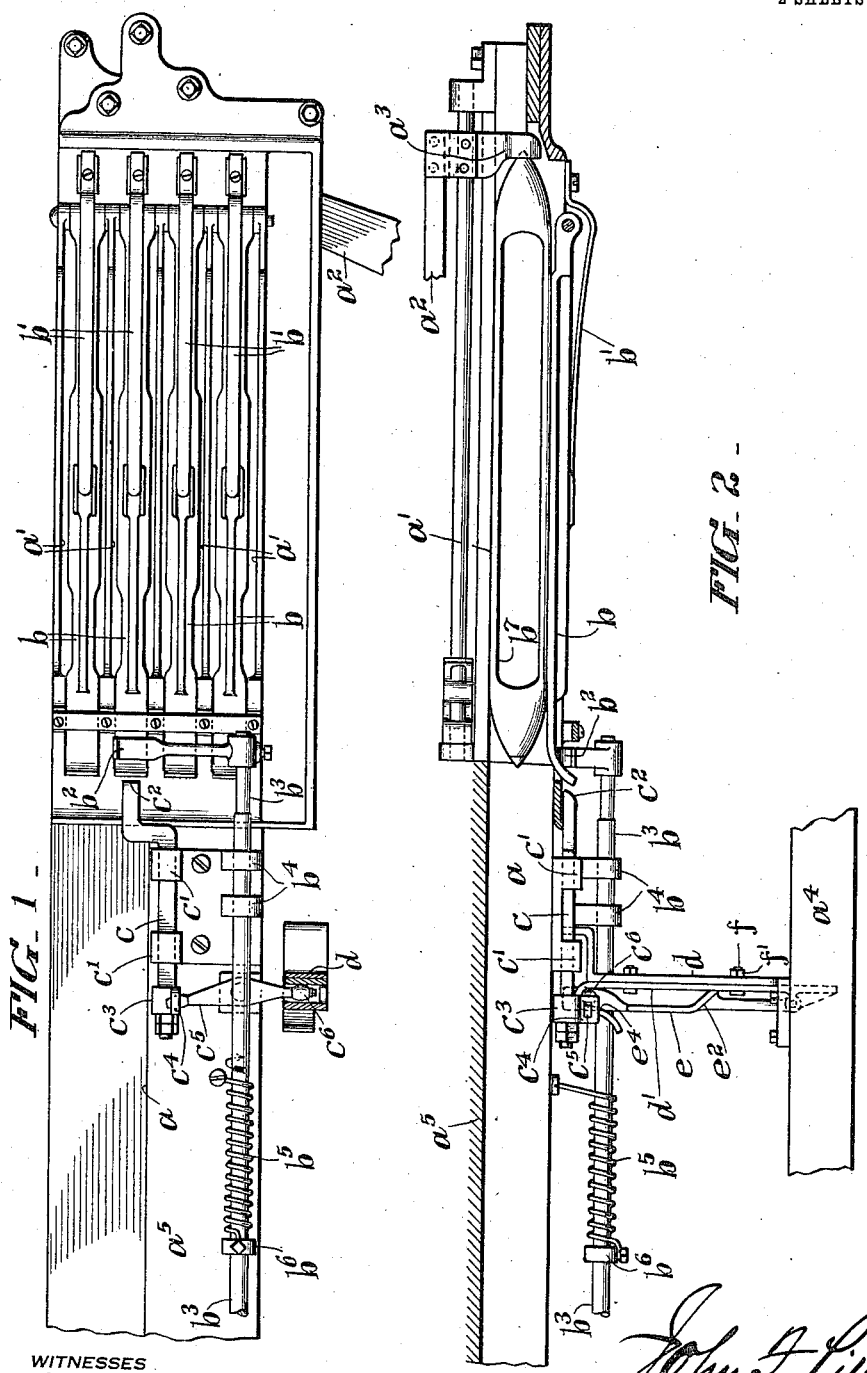

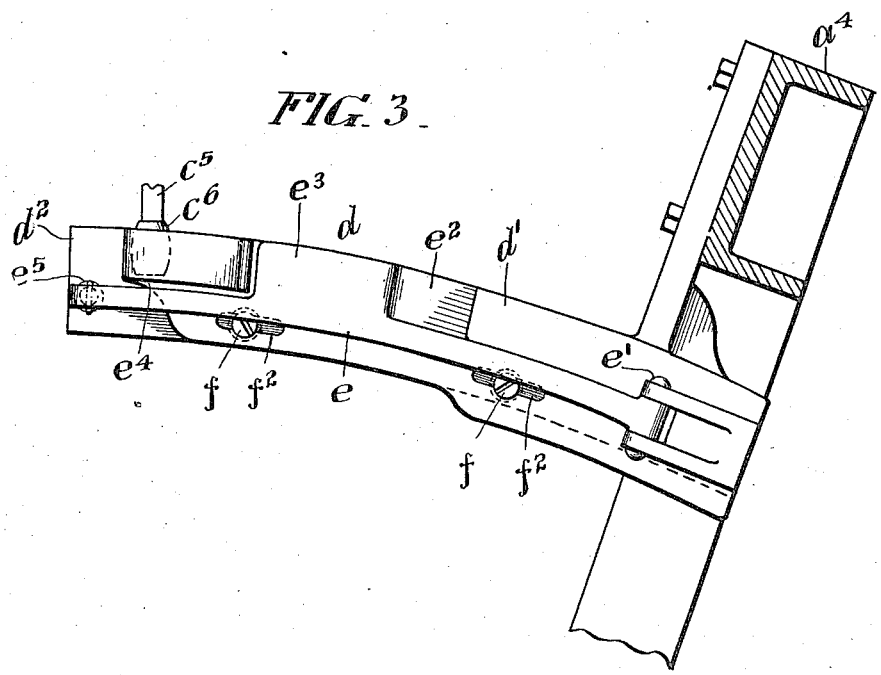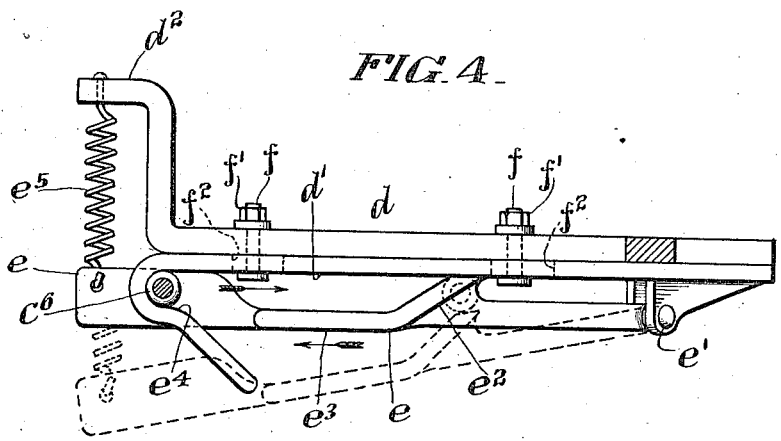

UNITED STATES PATENT OFFICE.

JOHN F. PILLSBURY, OF NORRISTOWN, PENNSYLVANIA, ASSIGNOR TO WILLIAM E. MONTAGUE, TRUSTEE, OF NORRISTOWN, PENNSYLVANIA.

SHUTTLE-RELEASE FOR LOOMS.

1,059,904.  Specification of Letters Patent.  Patented Apr. 22, 1913.

Application filed July 17, 1912. Serial No. 710,038.

*To all whom it may concern:*

Be it known that I, JOHN F. PILLSBURY, a citizen of the United States, residing at Norristown, in the county of Montgomery and State of Pennsylvania, have invented certain new and useful Improvements in Shuttle-Releases for Looms, of which the following is a specification.

My invention has relation to a mechanism for removing binding at the instant the shuttle of the loom is to be released to enable the same to start freely along the race of the loom; and in such connection my invention relates to the general arrangement of such a mechanism for the defined purpose.

The nature and scope of my present invention will be more fully understood from the following description taken in connection with the accompanying drawings forming part hereof, in which—

Figure 1, is a front elevation of a portion of a loom as shown with four equipped shuttle boxes and showing a shuttle release mechanism illustrated partly in section, embodying the main features of my present invention. Fig. 2, is a plan view, partly in section of the said shuttle release mechanism. Fig. 3, is a side elevation, partly in section, of the cam device of said shuttle release mechanism; and Fig. 4, is a plan view of said device as shown in Fig. 3, in connection with said shuttle release mechanism.

Referring to the drawings $a$, represents the shuttle race of the loom, $a^1$, the four shuttle-boxes, as fully shown in Fig. 1. $a^2$, is the picker-staff, and $a^3$, the picker. $a^4$, in broken section, represents the breast beam of the loom.

$b$, is a series of pivoted checks or swells, one for each of the four shuttle-boxes, $a^1$, as illustrated in Fig. 1. $b^1$, is a series of flat leaf springs arranged to normally bear against the said checks or swells $b$.

$b^2$, is a spring controlled vertical lever or binder mounted on a longitudinal shaft $b^3$. This shaft is held in bearings $b^4$, connected to the frame $a^5$, of the loom, as illustrated in Fig. 1. The shaft $b^3$, carries a coiled spring $b^5$, one end of which is connected to a collar $b^6$, secured to said shaft and the other end of this spring is attached to the frame $a^5$, for controlling the action of the lever $b^2$, in providing additional binding for the particular check or swell $b$, in operative engagement with a shuttle $b^7$, in a box $a^1$.

For reducing binding at the instant the shuttle is to be released so that it may travel freely along the race $a$, the following mechanism is employed for such purpose:—A right angle bar $c$, is mounted in guides $c^1$, secured to the lay $a^5$. The right angle end of the bar $c$, is provided with a tapered nose $c^2$, to readily engage the curved free end of a check or swell $b$, to permit of the shifting of a check or swell so as to overcome the tension under which it is held against a shuttle in a box $a^1$, and thereby to permit of quick release of a shuttle so as to be shot forward freely through the race $a$, of the loom. The opposite end of the bar $c$, carries a collar $c^3$, having a projecting lug $c^4$, to engage the upper end of a pivoted lever $c^5$, while the lower end carries a roller $c^6$, to engage a divided cam-device $e$. The said cam-device is carried by the breast-beam $a^4$, and is operated in the usual well-known manner. The roller $c^6$, travels with the lay $a^5$, as indicated by the arrow in Fig. 4, and by contact with the cam surface $e^3$, is oscillated to swing the lever $c^5$, whereby the position of the roller $c^6$, is shifted beyond the incline plane $e^2$, when the lay $a^5$, is about to assume its initial position. When the lay $a^5$, has assumed the position as indicated in Fig. 3, the cam-device $e$, will have caused the roller $c^6$, to shift to a position over the incline $e^2$, along the straight surface $e^3$, until it reaches the pocket $e^4$, which is its terminal point.

A spring $e^5$, is connected at one end to an arm $d^2$, and at its opposite end is connected to the end of the lever $e$, so as to maintain the same in contact with the cam surface $d^1$. The said spring $e^5$, is so arranged as to permit the lever $e$, to move about its pivot $e^1$, the instant the inclined surface $e^2$, is passing over the roller $c^6$, to return the lever $e$, to its initial position. As the roller $c^6$, is shifted over the cam surfaces $e^3$ and $e^2$, the lever $c^5$, will be oscillated to force the nose $c^2$, of the slide bar $c$, into engagement with the curved free end of a swell or check $b$, to thus remove the binding effect under which the shuttle has previously been held and thus to enable the picker-staff $a^2$, to shoot a shuttle forward unretarded, along the race of the loom.

The cam device $e$, is arranged with adjusting means, consisting of bolts $f$, and nuts $f^1$, operating in slots $f^2$, so as to give a longer or shorter cam surface in its travel over the roller $c^6$.

The mode of operation of the shuttle release mechanism hereinbefore described, is briefly as follows:—A shuttle $b^7$, being mounted in a box $a^1$, as illustrated in Fig. 2, is held under the tension of the spring pressed check or swell $b$, and the lay $a^5$, will have moved about its pivot in the direction of the breast-beam $a^4$, supporting the cam device $e$, operating on the roller $c^6$, of the vertical and centrally pivoted lever $c^5$, to cause an oscillation thereof and thus shifting of the nose $c^2$, of the bar $c$, into contact with the curved free end of the spring pressed check or swell $b$, to thereby free the shuttle $b^7$, from the tension under which it was previously held and to allow the pickerstaff $a^2$, to shoot the shuttle forward through the race $a$. At every movement of the lay $a^5$, a shuttle will be shot across the race $a$, so that another must be shifted into alinement with the race $a$. This is effected in any well-known manner, not shown. With each shift of shuttle-boxes $a^1$, another check or swell will be brought into a position to be operated upon by the nose $c^2$, of the bar $c$, as will be clearly understood from Fig. 1, to thereby enable a shuttle to enter a box and to be held under a binding friction until released in a manner such as hereinbefore fully explained.

Having thus described the nature and objects of my invention, what I claim as new and desire to secure by Letters Patent is:—

1. In a loom, the combination with a breast-beam, a lay and shuttle-boxes, of spring pressed checks or swells, spring pressed binders arranged to contact singly with said checks or swells, a slide-bar mounted on said lay mechanism to positively force an extremity of said bar against a check or swell to withdraw the latter against the action of said springs from contact with a shuttle and means connected with said lay and breast-beam for shifting said bar.

2. In a loom, the combination with a lay and shuttle-boxes, of spring pressed checks or swells, a spring pressed binder arranged to contact therewith, movable means connected with said lay to positively engage a check or swell to force the same out of contact with a shuttle, a breast-beam with means mounted thereon and operative connections between both of said means, whereby the said first named means is actuated.

3. In a loom, the combination with a lay and shuttle-boxes, of spring pressed checks or swells having curved free ends, a spring pressed binder arranged to contact with each of said checks or swells, a slidable bar connected with said lay and provided with a nose, a cam device carried by the breast-beam of the loom, a pivoted lever movably connected to said slidable bar and having a roller engaging said cam device to thereby swing said slidable bar into contact with the free end of a check or swell, to free the same from contact with a shuttle.

In witness whereof, I have hereunto set my signature in the presence of the two subscribing witnesses hereto.

JOHN F. PILLSBURY.

Witnesses:
   THOMAS M. SMITH,
   HELEN F. MILLER.

---

Copies of this patent may be obtained for five cents each, by addressing the "Commissioner of Patents, Washington, D. C."